3,186,797
PROCESS FOR CATALYTICALLY STEAM REFORMING HYDROCARBONS

Thomas James Perrett Pearce and Richard John Young, Norton-on-Tees, England, assignors to Imperial Chemical Industries Limited, London, England, a corporation of Great Britain
No Drawing. Filed Apr. 13, 1960, Ser. No. 21,854
Claims priority, application Great Britain, Apr. 17, 1959, 13,183/59
1 Claim. (Cl. 23—212)

This invention relates to the process known as steam reforming of hydrocarbons.

Hydrocarbons react with steam in the presence of a catalyst, at elevated temperature and at atmospheric or higher pressure, to give hydrogen and oxides of carbon. Such a process finds many applications in industry, such as for example production of methanol synthesis gas from a desulphurised straight run distillation fraction of petroleum, and is commonly known as steam reforming of hydrocarbons.

Commercially available catalysts which are suitable for use in a process of steam reforming of hydrocarbons usually contain nickel and several supporting materials, including magnesia, kaolin and a hydraulic binding agent such as for example Portland cement or "Ciment Fondu" (the word "Ciment Fondu" is a registered trademark). This type of catalyst may successfully be employed in a continuous process of steam reforming of lower paraffinic hydrocarbons such as methane, propane or butane, using a steam to hydrocarbon ratio corresponding to about 3 molecules of steam per atom of carbon, without any appreciable deposition of carbon taking place. We have found that higher saturated hydrocarbons, such as for example a straight run petroleum distillate of boiling range 30° C. to 220° C. can be reformed with steam in the presence of a catalyst of the type described above; but in such a process there is a tendency for carbon to be deposited on the catalyst. Carbon deposition can be diminished, or even eliminated, by using a large excess of steam. However, this remedy is expensive, on account of the cost of the additional steam required and the cost of heating this steam to the reaction temperature, which may be say between 800° C. and 900° C. Furthermore we have found that the tendency to form carbon is greater when the reaction is effected at elevated pressures; and the use of excess steam to counteract this tendency is even more expensive under these conditions.

We have discovered that catalytic compositions as hereinafter defined are less prone to catalyse deposition of carbon than are commercially available catalysts of the type described above, provided that reaction conditions as hereinafter specified are used.

According to the present invention there is provided a process of steam reforming of hydrocarbons, comprising reacting a hydrocarbon boiling within the range 30° C. to 220° C. with steam in a proportion corresponding to at least four molecules of steam per atom of carbon, at a temperature between 600° C. and 950° C., at a pressure between 0 and 50 atmospheres absolute, and in the presence of a catalyst comprising nickel, a substantially inert refractory oxide material capable of supporting the nickel, and a substantially inert hydraulic binding agent, the catalytic composition being such that it contains not more than 5% by weight of silica.

The process of the present invention is a strongly endothermic one.

The hydrocarbon may conveniently be a straight run distillation fraction of petroleum having a boiling range within the range 30° C. to 220° C., which is commonly known as light distillate.

A steam ratio of about five is usually suitable. That is to say the mixture of hydrocarbon and steam may suitably be of such composition that there are about five molecules of steam per atom of carbon.

The pressure is preferably between 1 and 30 atmospheres.

The optimum temperature is dependent on the pressure used and the composition of gas which it is desired to obtain as a product of the process. In practice a temperature of about 700° C. to 800° C. generally is convenient. Example 2 gives the actual compositions of product gas which may be expected when using two different temperatures within the range 700° C. to 800° C.

The refractory oxide material preferably comprises alumina, and in particular gamma alumina. It may consist substantially entirely of alumina; but it is preferred that it comprise a mixture of alumina and magnesia.

A particularly suitable hydraulic binding agent for use in the process is "Ciment Fondu" (registered trademark).

The catalytic composition may conveniently consist essentially of between 10% and 30% (preferably between 15% and 25%) of nickel, between 25% and 50% (preferably between 30% and 40%) of the hydraulic binding agent, the remainder comprising the refractory oxide material, the percentages being by weight. As stated above, the refractory oxide material may comprise a mixture of magnesia and alumina, in which case the catalytic composition used in the process of the invention may conveniently contain between 10% and 30% (preferably between 15% and 20%) by weight of magnesia.

The catalytic composition preferably contains not more than 2% by weight of silica.

A catalytic composition as hereinbefore specified may conveniently be made by mixing with an aqueous solution of a soluble nickel salt the powdered refractory oxide material or a substance which yields the said refractory oxide on heating, precipitating the nickel in the form of an insoluble material capable, on heating, of yielding nickel oxide, washing and drying the solid obtained on filtering the slurry thus produced, finely grinding the product obtained, mixing this with the hydraulic binding agent, and damping the mixture with water. The final product may conveniently be converted into pellets.

When the refractory oxide material contains alumina, aluminium trihydrate may conveniently be used in the above described method of preparation of the catalytic composition.

During use of a catalytic composition prepared as described above, in the process of our invention, nickel oxide is reduced to nickel, and water is lost from the various components of the composition, including any water of hydration present in the refractory oxide material. If desired, before use the nickel oxide of the catalyst may be reduced by heating in a current of hydrogen.

As stated above an advantage of the catalytic compositions used in our process is that when the reaction conditions are as hereinbefore specified the compositions show little tendency to catalyse deposition of carbon. We believe that the better performance of the catalyst compositions used in our process, as compared with commercially available ones of the type referred to above, depends on the lower silica content of the former.

Using a process according to the present invention, it is possible under suitable conditions (such as, for instance, those indicated in the accompanying example) to reform a hydrocarbon, such as for example light distillate, and thereby produce a gas containing say 6% to 8% of methane. Thus the invention renders possible the use of a secondary reformer in which at least part of the gas produced in the primary reformer is burnt with injected air, thereby providing the heat necessary for completing the destruction of hydrocarbons by reaction with steam in the presence of a catalyst, and producing a gas containing nitrogen and hydrogen, which, when purified from oxides of carbon, is suitable for synthesis of ammonia. Thus an advantage of the present invention is that it provides a process which permits a primary steam reformer to be operated under conditions whereby there may be produced the right amount of methane for a secondary reformer in which ammonia synthesis gas may be produced in the most economical way.

EXAMPLE 1

10.9 kgm. of magnesia and 26.7 kgm. of alumina trihydrate were added to an aqueous solution of nickel nitrate containing 5.7 kgm. of $Ni(NO_3)_2 \cdot 6H_2O$. To this sufficient soda ash was added to precipitate the nickel. The slurry of magnesia, alumina and nickel containing precipitate was filtered, washed, and dried at 400° C. The product was finely ground, mixed with 40% of its weight of "Ciment Fondu" (registered trademark), damped with water and pelleted.

The silica content of the catalyst produced was found to be 2%.

*Performance of catalyst*

The performance of a commercially available catalyst comprising nickel oxide, magnesia, kaolin and "Ciment Fondu" (registered trademark), the silica content being 17%, was compared with a catalyst prepared as described above, in a process of steam reforming of a desulphurised straight run distillation fraction of petroleum having a boiling range of 30° C. to 220° C.

When the reaction was carried out at atmospheric pressure using the commercially available catalyst, serious carbon deposition was found to occur if the steam to hydrocarbon ratio was not more than that corresponding to five molecules of steam per atom of carbon, or if the catalyst temperature was less than about 850° C. Under similar conditions carbon deposition was even greater when reaction pressures in excess of 100 lb./in.$^2$ were used.

When a catalyst prepared as described above was used there was no sign of carbon deposition at a steam to hydrocarbon ratio corresponding to 4 molecules of steam per atom of carbon, a total pressure of 180 lb./in.$^2$ and a catalyst temperature of about 700° C. Under these conditions it was possible to produce a gas containing 6% to 8% of methane, which could be converted to ammonia synthesis gas in a secondary reformer into which air was injected.

EXAMPLE 2

45 l./hr. of a desulphurised straight run distillation fraction of petroleum, having a specific gravity of 0.7 kgm./l., were vaporised and the resulting vapour was heated to 400° C. The vapour was then mixed with 200 kgm./hr. of steam which had also been heated to 400° C. The steam ratio of the mixture produced corresponded to 5 molecules of steam per atom of carbon.

The mixture was passed into a reaction tube containing 60 l. of a catalyst prepared as described in Example 1. The tube was suspended in a furnace and heated externally so that the exit temperature of the product gas was maintained at 770° C. The pressure at the outlet of the tube was maintained at 180 lb./in.$^2$ by means of a pressure controller following a cooler which was connected to the exit of the catalyst tube. 168 m.$^3$/hr. of gas was produced, the gas having the following composition by volume, expressed on a dry basis:

|  | Percent |
|---|---|
| $CO_2$ | 17.2 |
| $CO$ | 9.5 |
| $H_2$ | 70.0 |
| $CH_4$ | 3.3 |

By reducing the tube exit temperature to 700° C., the methane content of the exit gas was increased. The gas analysis, expressed on a dry basis, was:

|  | Percent |
|---|---|
| $CO_2$ | 19.7 |
| $CO$ | 6.0 |
| $H_2$ | 67.3 |
| $CH_4$ | 7.0 |

36 m.$^3$ of air were added to every 100 m.$^3$ of this gas, and the mixture produced, including the steam which had not reacted, was passed into a secondary reformer containing catalyst of the same composition as that in the primary reformer, at a pressure of 180 lb./in.$^2$ and inlet temperature of 700° C. Sufficient heat was generated to convert the remaining methane. The gas emerging from the secondary reformer, after having been purified in the usual way, contained the right amount of nitrogen for ammonia synthesis.

We claim:

A continuous long term process of catalytically steam reforming hydrocarbons substantially free from carbon lay down on the catalyst, comprising reacting a substantially sulphur free straight run distillation fraction of petroleum boiling in the range 30° C. to 220° C. with steam in a proportion corresponding to from about 4 to about 5 molecules of steam per atom of carbon in the said distillation fraction to produce a gaseous product, the reaction being conducted at a temperature between 600° C. and 950° C. and a pressure between 1 and 50 atmospheres absolute in the presence of a catalyst consisting essentially of nickel and a substantially inert refractory support composition for the nickel consisting of a refractory oxide material and a hydraulic binding agent, the support composition containing at most about 5% of silica by weight of the catalyst, and thereafter burning at least part of said gaseous product with injected air in a secondary reformer, thereby producing the heat necessary for completing the destruction of hydrocarbons by reaction with steam in the presence of the catalyst, and producing a gas containing nitrogen and hydrogen.

References Cited by the Examiner

UNITED STATES PATENTS

| 2,038,566 | 4/36 | Huettner et al. | 23—212 |
| 2,524,840 | 10/50 | Shapleigh | 23—212 |
| 2,565,395 | 8/51 | Scharmann | 23—212 |
| 2,628,890 | 2/53 | Shapleigh | 23—212 |
| 2,781,248 | 2/57 | Gorin | 23—212 |
| 2,793,938 | 5/57 | Frank | 23—212 |

MAURICE A. BRINDISI, *Primary Examiner.*

GEORGE D. MITCHELL, *Examiner.*